US012441586B2

(12) United States Patent
Trotsenburg et al.

(10) Patent No.: US 12,441,586 B2
(45) Date of Patent: Oct. 14, 2025

(54) METHOD FOR RAISING AN ALERT IN CONNECTION WITH THE USE OF A PLATFORM LIFT

(71) Applicant: TK HOME SOLUTIONS B.V., LN Krimpen aan den Ijssel (NL)

(72) Inventors: Dave Trotsenburg, JX Rotterdam (NL); Cornelis Boxum, GV Delfgauw (NL); Maarten Dubbeld, BM Barendrecht (NL); Gert-jan Verduijn, SC Terheijden (NL)

(73) Assignee: TK Home Solutions B.V., LN Krimpen aan den Ijssel (NL)

( * ) Notice: Subject to any disclaimer, the term of this patent is extended or adjusted under 35 U.S.C. 154(b) by 45 days.

(21) Appl. No.: 18/012,068

(22) PCT Filed: Jun. 21, 2021

(86) PCT No.: PCT/EP2021/066784
§ 371 (c)(1),
(2) Date: Dec. 21, 2022

(87) PCT Pub. No.: WO2021/259841
PCT Pub. Date: Dec. 30, 2021

(65) Prior Publication Data

US 2023/0242376 A1 Aug. 3, 2023

(30) Foreign Application Priority Data

Jun. 23, 2020 (EP) .................................... 20181766

(51) Int. Cl.
*B66B 9/08* (2006.01)
*B66B 5/00* (2006.01)

(52) U.S. Cl.
CPC .............. *B66B 5/0031* (2013.01); *B66B 9/08* (2013.01)

(58) Field of Classification Search
CPC ....... B66B 9/08; B66B 5/0031; B66B 25/006; B66B 25/00; B66B 1/3461
(Continued)

(56) References Cited

U.S. PATENT DOCUMENTS 8,085,146 B2 12/2011 Rees
8,660,565 B2 * 2/2014 Hall .......................... B66B 9/08 455/450
(Continued)

FOREIGN PATENT DOCUMENTS

CN 204847687 U * 12/2015
EP 2377795 A1 * 10/2011 ............... B66B 1/34
(Continued)

OTHER PUBLICATIONS

International Search Report dated Aug. 26, 2021; International Application No. PCT/EP2021/066784.
(Continued)

*Primary Examiner* — Gene O Crawford
*Assistant Examiner* — Muhammad Awais
(74) *Attorney, Agent, or Firm* — Dinsmore & Shohl LLP

(57) ABSTRACT

The present disclosure for raising an alert in connection with the use of a platform lift, in particular a stairlift, the lift having
- a rail,
- a drive unit having a platform, a chair (8), for driving along the rail,
- at least one control unit arranged at the drive unit. The method including determining the way of usage of the platform lift, comparing the way of usage with an alert definition, determining whether the way of usage confirms with the alert definition, determining whether the way of usage confirms with the alert definition, gener- (Continued)

ating an alert, if the way of usage conforms to the alert definition and providing the alert to a user.

19 Claims, 3 Drawing Sheets

(58) Field of Classification Search
USPC .......................................................... 198/323
See application file for complete search history.

(56) References Cited

U.S. PATENT DOCUMENTS

| | | | | |
|---|---|---|---|---|
| 2015/0068847 | A1* | 3/2015 | Ooms | H04W 8/22 187/201 |
| 2017/0337796 | A1* | 11/2017 | Helal | G08B 21/0492 |
| 2021/0163263 | A1* | 6/2021 | Boxum | B66B 1/30 |

FOREIGN PATENT DOCUMENTS

| | | | | |
|---|---|---|---|---|
| EP | 3178770 | A1 * | 6/2017 | |
| JP | 5749040 | B2 * | 7/2015 | |
| WO | WO-2010141865 | A1 * | 12/2010 | A61G 7/10 |
| WO | WO-2014041351 | A1 * | 3/2014 | B66B 5/0012 |
| WO | WO-2017178803 | A1 * | 10/2017 | G08B 21/187 |
| WO | WO-2018215238 | A1 * | 11/2018 | B66B 1/3461 |
| WO | WO-2020030899 | A1 * | 2/2020 | B66B 5/0031 |
| WO | WO-2020038794 | A1 * | 2/2020 | B66B 9/08 |
| WO | WO-2020049271 | A1 * | 3/2020 | B66B 1/3453 |

OTHER PUBLICATIONS

Grundy, John, Supporting Diverse Challenges of Ageing with Digital Enhanced Living Solutions, Telehealth for our Ageing Society 75 M.E.L. van den Berg and A.J. Maeder (Eds.), IOS Press, 2018, 14 pages.

* cited by examiner a)

b)

METHOD FOR RAISING AN ALERT IN CONNECTION WITH THE USE OF A PLATFORM LIFT

CROSS-REFERENCE TO RELATED APPLICATIONS

This application is the U.S. National Stage of PCT/EP2021/066784 filed on Jun. 21, 2021, which claims priority to European Patent Application 20181766.5 filed on Jun. 23, 2020, the entire content of both are incorporated herein by reference in their entirey.

TECHNICAL FIELD

The present disclosure refers to a method for raising an alert in connection with the use of a platform lift and an arrangement comprising a platform lift.

BACKGROUND

A platform, such as a stairlift, lift is a product which is typically meant for people with impaired mobility, mostly elderly people, to provide support to get upstairs and downstairs without removing the staircase and thus maintaining the functionality of the stairs for persons which are (still) able to climb the stairs themselves. The platform lift is often installed in people's homes and typically comprises a drive unit with a chair or another platform, driven by a drive, which drives along a rail, mounted on or along one or more staircases.

EP 1 554 210 A1 discloses a platform lift for the use of a disabled person in a wheelchair. WO 2013/129923 A1 discloses a platform lift in the form of a stairlift. In both cases the platform is part of a drive unit which travels along at least one guide rail. A leveling mechanism is provided to hold the platform always in a horizontal orientation, even if the inclination angle of the guide rail is changing along the path of travel. The rail of such platform lifts has a curved shape, like shown in FIG. 3 of WO 2015/052489 A1.

SUMMARY

It is an aspect of the present disclosure to improve the scope of operation of a platform lift. This aspect is solved by a method and an arrangement according to the claims, embodiments and the description.

According to the present disclosure a way of usage of the platform lift is determined; the way of usage is compared to with an alert definition, and an alert is generated an alert, if the way of usage conforms to the alert definition; The alert is provided to a user.

Differentiation is made between two users. A first user is a person who is intended to be transported by the lift. The first user may be an elder or handicapped person who needs particular support by a another person. A second person is person who is not intended to be transported by the lift. Instead the second person is someone who takes care of the first person. It is desired that the second get informed if the first person gets into an undesirable situation.

The alert definition could be a simple "If . . . , then . . . " instruction, for example: "if the current way of usage does not conform to a first condition, then raise an alert according to the second parameter".

In an embodiment the alert definition is generated by a user input and stored in a database.

In an embodiment the alert definition is generated by a self-learning algorithm and/or an artificial intelligence, based on a plurality of usage records recorded during usage of the platform lift. Here the usage records may be permanently reviewed on variations, so that the alert definitions can be permanently adapted to the varying way of usage.

In an embodiment according to the alert definition the alert is provided after expiry of a latest time of expected user action without any user corresponding user action. So in case the first user does not use the lift as usual, this may be an indication that by accident the first user is not able to use the lit as usually. This may be the trigger to create said alert.

To avoid any false alarm in an embodiment according to the alert definition the alert is provided after expiry of an additional waiting period after the latest time of expected user action has expired without any corresponding user action. The waiting period is amendable by a user input, and/or by a user input made by the second user.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals. The present disclosure is described in more detail by means of the figures, herein shows:

DETAILED DESCRIPTION

Figure 1:
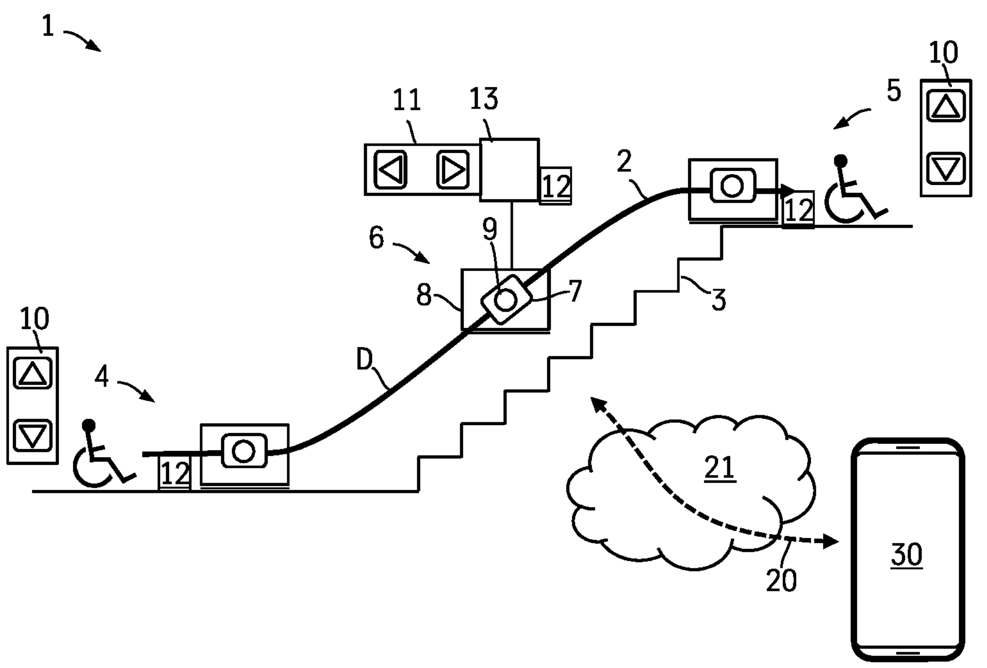
FIG. 1*a* schematically illustrates a side view of two platform lifts according to one or more embodiments shown and described herein.
FIG. 1*b* schematically illustrates a second aspect of the platform of FIG. 1*a* including a seat according to one or more embodiments shown and described herein.
Figure 1:
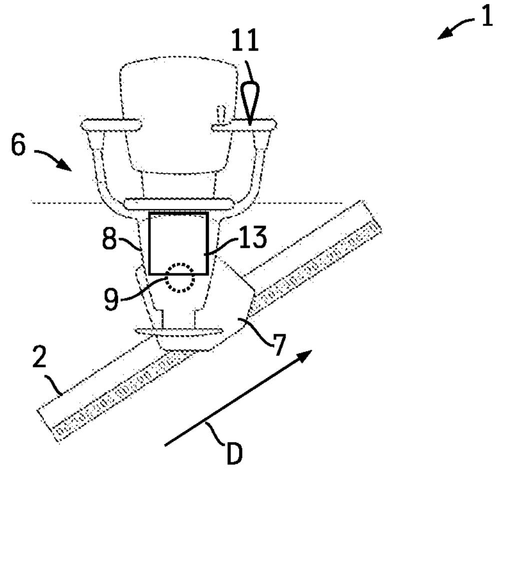

FIG. 1*a* shows two exemplary embodiments of a generic platform lift 1, to which the present disclosure can be applied. In FIG. 1*a*, a platform lift 1 for the use with a wheelchair is shown. The platform 8 therefore includes a lifting ramp, which can travel along a direction of travel D from a first landing area 4 (1st floor) to a second landing area 5 (second floor) and vice versa. The direction of travel D is defined by a rail 2 and is limited in main by the course of an existing stairway 3 in a house. An alternative embodiment is shown in FIG. 1*b* wherein the platform 8 includes a seat (the remaining features of FIG. 1*a* may also be present in the embodiment of FIG. 1*b*).

The rail 2 can have a curved shape, which deviates from a straight line; thus the direction of travel may change at least once during the course of the rail 2.

The platform 8 is part of a drive unit 6, which further comprises a carrier 7. The carrier 7 has non-shown rollers, which roll along the rail 2. For driving the carrier 7 positive engagements (only shown in detail in FIG. 1*b*) are provided on the rail 2, which cooperates with a driving mechanism, such as a driven pinion (not shown), of the drive unit 6. A leveling mechanism 9 is provided on the drive unit 6, to keep the platform 8 always in a horizontal orientation, even if the inclination of the rail 2 varies during its course.

At the landing areas a call button device 10 is provided. By pressing a button of the call button device 10 a first user located at the respective landing area can request that the platform 8 moves in a certain direction (e.g. up or down or in direction of one of the landing areas 4, 5; 'Call-and-Park'-function).

At the drive unit 6 a control interface 11 is provided, so that the first user moving with the platform 6 can give instructions to the drive on the intended driving direction of the drive unit 6. As an example the control interface 11 can be a button 11 (FIG. 1*a*) or a joystick 11 (FIG. 1*b*). Several sensors 12 are provided at any positions or along the rail or at the drive unit to determine several operation conditions.

The stairlift is connected to a mobile phone 30 of a second user via a data connection 20; the data connection uses the internet 21. The second user is a person who does not use the stairlift. However the second uses is the user of the mobile phone. The second user is distinct form the first user.

Figure 2:
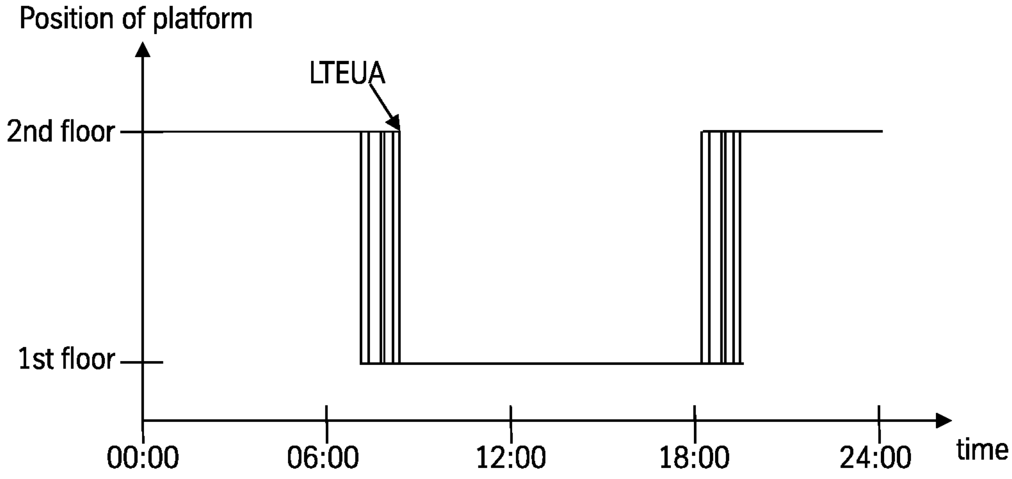
FIG. 2 depicts a schematic diagram of a typical use of the stairlift according to one or more embodiments shown and described herein.

FIG. 2 shows a typical profile of usage. In the morning the first user wakes up and travels between 7:00 and 8:00 from the second landing area (e.g. in the 2nd floor) to the first landing area (e.g. in the 1st floor). In the evening it is the other way. Between 18:00 and 19:00 the first user travels from the first landing area to the second landing area.

Figure 3:
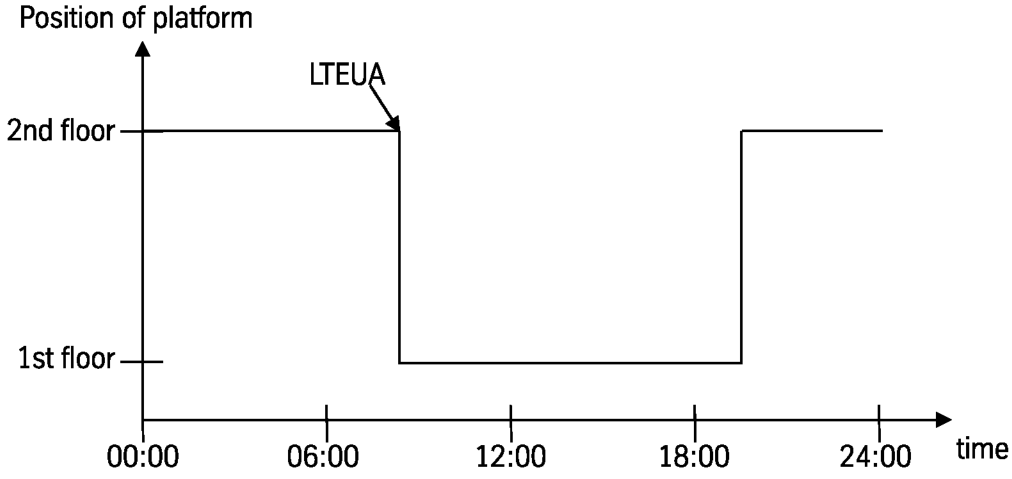
FIG. 3 depicts a schematic diagram of an interpreted use of the stairlift according to one or more embodiments shown and described herein.

An interpretation of this profile leads to the following features of usage as illustrated in FIG. 3:

a) Usually the first user travels latest at 8:00 from the second landing area to the first landing area.

b) Usually the first user travels latest at 19:00 from the first landing area to the second landing area.

Both features define a last time of expected user action (LTEUA) each at 08:00 and at 19:00.

Figure 4:
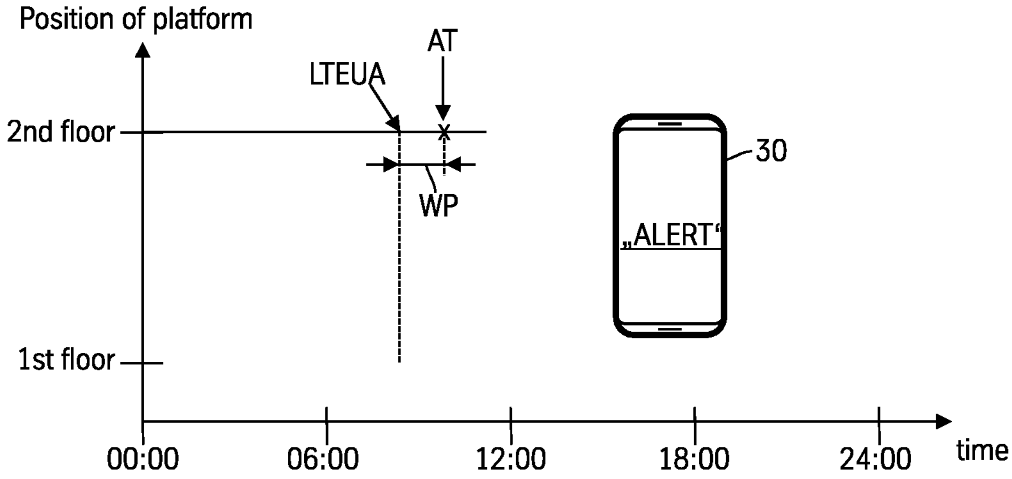
FIG. 4 depicts a schematic diagram of an atypical use of the stairlift according to one or more embodiments shown and described herein.

FIG. 4 shows an abnormal profile of usage. Here the first user does not travel from the second landing area to the first landing area. So here the last time of expected user action LTEUA each at 08:00 passes without any user action. After expiry of a waiting period WP an alert is indicated on the mobile phone at an alert timer AT, so that the second user gets aware, that the first user did not use the lift as usual. The second user may then call an emergency physician, or the second user may simply try to contact the first user by telephone and check if everything is ok.

Figure 5:
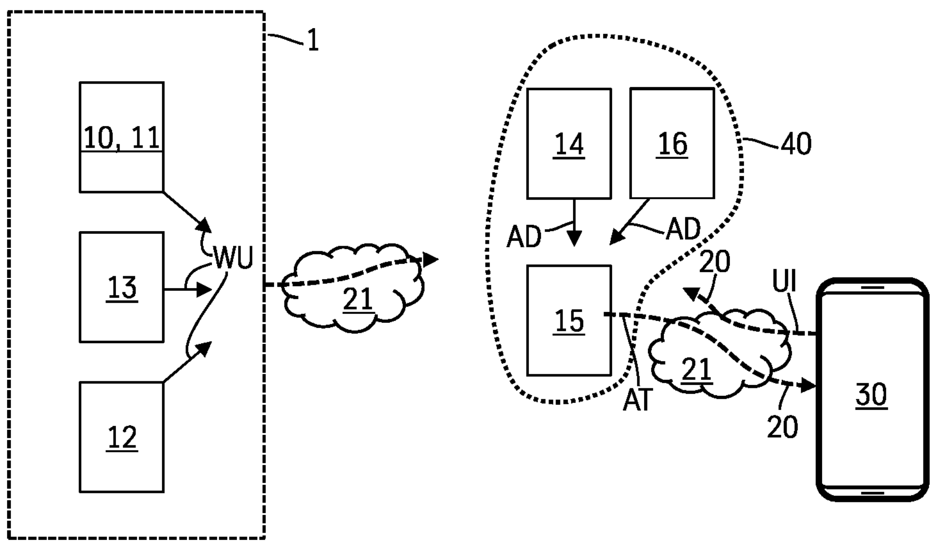
FIG. 5 depicts a schematic structure of an arrangement according to one or more embodiments shown and described herein.

FIG. 5 shows an embodiment for providing an alert to second user. An alert generator 15 is providing an alert AT, if the stairlift 1 is not used as expected. The alert generator 15 gets input from the call device 10, the control button 11, from any sensors 12, and/or from the control unit 9. Based on these inputs the alert generator 15 can determine the actual way of usage WU of the lift, such as whether the stairlift is used at all, in which manner the stairlift is used if the stairlift is not used at all.

The alert generator 15 receives input from a usage interpretor 14. The usage interpretor 14 receives input from the call device 10, the control button 11 from any sensors and/or from the control unit 9. The usage interpretor analyses usage profiles such as shown in FIG. 2. Based on said usage profiles the interpretor can generate alert definitions AD such as said last time of expected user action LTEUA linked to a certain expected user action. The interpretor can generate the alert definition AD by a self learning algorithm and/or a artificial intelligence.

The interpretor provides said alert definitions AD to the alert generator 15. The alert generator compares the actual way of usage WU with the alert definition AD and based on said comparison the alert generator 15 may generate an alert AT.

In principle the alert generator 15, the database 5 and/or the interpretor 14 can be located at the platform lift itself. In the illustrated embodiment shown in FIG. 5, the alert generator 15, the database 16 and/or the interpretor 14 can be located at a server 40 located remotely from the stairlift 1. The signals WU representing the way of usage can be transmitted also via a data connection 20 via the internet 21.

Alternatively, a predefined alert definition AD can be prestored in a database 17 preprogrammed by a user input (UI). Here a user may provide the following instruction to the alert generator: "If the stairlift does not travel from the second landing area to the first landing area between 06:00 and 08:15, raise an alert!"

Also via a user input the waiting period WP can be defined and stored in the database, in the interpretor and/or in the alert generator.

LIST OR REFERENCE SIGNS

1 platform lift
2 rail
3 stairs
4 first landing area
5 second landing area
6 drive unit
7 carrier
8 platform
9 leveling mechanism
10 call device at landing area
11 control button device/control joystick device at drive unit
12 sensor
13 control unit
14 interpreter
15 alert generator
16 database
20 data connection
21 internet
30 mobile phone
40 remote server
D path of travel D
AD alert definition
AT alert
WU way of usage
LTEUA last time of expected user action

The invention claimed is:

1. A method for raising an alert in connection with the use of a platform lift for raising an alert, the platform lift comprising a rail, a drive unit having a platform and a chair, for driving along the rail, and at least one control unit arranged at the drive unit, the method comprising the following steps:

determining the way of usage of the platform lift based on a plurality of usage profiles recorded during usage of the platform lift to determine a usual user action of a first user;

comparing the way of usage with an alert definition;

determining whether the way of usage confirms with the alert definition;

generating an alert, when the way of usage conforms to the alert definition; and providing the alert to a second user, wherein according to the alert definition, the alert is provided after expiry of a latest time of expected user action without any user corresponding user action, the latest time of the expected user action without any user corresponding user action is based on when the first user does not use the lift as the usual user action of the first user.

2. The method according to claim 1, wherein the alert definition is generated by a user input.

3. The method according to claim 1, wherein that the alert definition is generated by a self-learning algorithm and/or an artificial intelligence, based on the plurality of usage records recorded during usage of the platform lift.

4. The method according to claim 1, wherein that according to the alert definition the alert is provided after expiry of an additional waiting period after the latest time of expected user action without any user corresponding user action.

5. The method according to claim 4, wherein that the additional waiting period is amendable by a user input.

6. The method according to claim 1, wherein that after the alert definition is generated the alert definition is stored in a database.

7. The method according to claim 1, wherein:

during regular usage of the platform lift a plurality of usage records are recorded; and based on the recorded usage records at least one alert definition is recorded and stored in a database.

8. A system comprising:

a platform lift having:

a rail, a drive unit having a platform and a chair for driving along the rail, and at least one control unit arranged at the drive unit, an electronic user device;

located remote from the platform lift, the at least one control unit configured to:

determine the way of usage of the platform lift based on a plurality of usage profiles recorded during usage of the platform lift to determine a usual user action of a first user;

compare the way of usage with an alert definition;

determine whether the way of usage confirms with the alert definition;

generate an alert, when the way of usage conforms to the alert definition; and provide the alert to a second user such that the alert is indicated at the electronic user device, wherein according to the alert definition, the alert is provided after expiry of a latest time of expected user action without any user corresponding user action, the latest time of the expected user action without any user corresponding user action is based on when the first user does not use the lift as the usual user action of the first user.

9. The system according to claim 8, further comprising:

an interpreter configured to generate said alert definition based on a plurality of usage records recorded during usage of the platform lift.

10. The method according to claim 8, wherein the electronic user device is a mobile phone or tablet PC.

11. The method according to claim 1, wherein the platform lift is a stairlift.

12. A platform lift for raising an alert, the platform lift comprising a rail, a drive unit having a platform and a chair, for driving along the rail, and at least one control unit arranged at the drive unit, the control unit configured to;

determine the way of usage of the platform lift based on a plurality of usage profiles recorded during usage of the platform lift to determine a usual user action of a first user;

compare the way of usage with an alert definition;

determine whether the way of usage confirms with the alert definition;

generate an alert, when the way of usage conforms to the alert definition; and provide the alert to a second user, wherein the alert definition is generated by a self-learning algorithm and/or an artificial intelligence, based on the plurality of usage records recorded during usage of the platform lift by the first user such that the latest time of the expected user action without any user corresponding user action is based on when the first user does not use the lift as the usual user action of the first user.

13. The platform lift according to claim 12, wherein the usage records may be permanently reviewed on variations such that the alert definitions are permanently adapted to a varying way of usage.

14. The platform lift according to claim 13, wherein the alert definition is generated by a user input.

15. The platform lift according to claim 13, wherein according to the alert definition, the alert is provided after expiry of a latest time of expected user action without any user corresponding user action.

16. The platform lift according to claim 13, wherein that according to the alert definition the alert is provided after expiry of an additional waiting period after the latest time of expected user action without any user corresponding user action.

17. The platform lift according to claim 16, wherein that the waiting period is amendable by a user input.

18. The platform lift according to claim 12, wherein that after the alert definition is generated the alert definition is stored in a database.

19. The method according to claim 1, wherein the waiting period is amendable by a user input by the first user and/or by a user input made by the second user.

* * * * *